US010354145B2

(12) United States Patent
Nguyen et al.

(10) Patent No.: US 10,354,145 B2
(45) Date of Patent: Jul. 16, 2019

(54) ASSOCIATING A USER IDENTITY WITH A MOBILE DEVICE IDENTITY

(71) Applicant: Carnegie Mellon University, Pittsburgh, PA (US)

(72) Inventors: Thanh Le Nguyen, Sunnyvale, CA (US); Yu Seung Kim, Sunnyvale, CA (US); Patrick Tague, Sunnyvale, CA (US); Joy Zhang, Palo Alto, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 14 days.

(21) Appl. No.: 15/510,451

(22) PCT Filed: Sep. 11, 2015

(86) PCT No.: PCT/US2015/049803
§ 371 (c)(1),
(2) Date: Mar. 10, 2017

(87) PCT Pub. No.: WO2016/040874
PCT Pub. Date: Mar. 17, 2016

(65) Prior Publication Data
US 2017/0308757 A1    Oct. 26, 2017

Related U.S. Application Data

(60) Provisional application No. 62/071,000, filed on Sep. 11, 2014.

(51) Int. Cl.
*G06K 9/00* (2006.01)
*H04W 4/02* (2018.01)
(52) U.S. Cl.
CPC ..... *G06K 9/00771* (2013.01); *G06K 9/00342* (2013.01); *H04W 4/02* (2013.01)

(58) Field of Classification Search
CPC ........... G06K 9/00771; G06K 9/00255; G06K 9/00342
(Continued)

(56) References Cited

U.S. PATENT DOCUMENTS

2006/0270371 A1    11/2006  Sugar
2009/0042593 A1    2/2009   Yavuz et al.
(Continued)

FOREIGN PATENT DOCUMENTS

WO    WO016040874    3/2016

OTHER PUBLICATIONS

International Search Report and Written Opinion dated Dec. 14, 2015 for International Appln. No. PCT/US15/49803 (24 pgs.).

*Primary Examiner* — Justin P. Misleh
(74) *Attorney, Agent, or Firm* — Fish & Richardson P.C.

(57) ABSTRACT

A system includes, in one aspect, one or more processing devices that perform operations comprising: detecting one or more human objects in images captured by a visual image recording device; obtaining a motion timeseries for each of the detected one or more human objects using the captured images; obtaining a received signal strength (RSS) timeseries for each of the one or more mobile devices, based on received RF signals from the one or more mobile devices; and generating an association between (i) identifying data for a first mobile device of the one or more mobile devices, and (ii) identifying data for one of the one or more human objects representing a first human, wherein the first mobile device has an RSS timeseries that fluctuates at a time period corresponding to movement in the obtained motion timeseries for the one of the one or more human objects representing the first human.

27 Claims, 9 Drawing Sheets

(58) Field of Classification Search
USPC .......................................................... 382/118
See application file for complete search history.

(56) References Cited

U.S. PATENT DOCUMENTS

| | | | |
|---|---|---|---|
| 2010/0130182 A1* | 5/2010 | Rosen ................. | G06K 9/00785 455/414.1 |
| 2011/0021167 A1* | 1/2011 | Shellhammer ....... | H04B 7/0837 455/226.1 |
| 2012/0046044 A1* | 2/2012 | Jamtgaard ............. | H04W 4/029 455/456.1 |
| 2012/0250546 A1* | 10/2012 | Hamida .................. | H04L 43/00 370/252 |
| 2014/0011518 A1 | 1/2014 | Valaee et al. | |
| 2014/0147020 A1 | 5/2014 | Baldwin | |
| 2015/0023562 A1* | 1/2015 | Moshfeghi ............ | G01S 5/0263 382/106 |
| 2015/0025936 A1* | 1/2015 | Garel ................. | G06Q 30/0201 705/7.29 |

\* cited by examiner

ASSOCIATING A USER IDENTITY WITH A MOBILE DEVICE IDENTITY

CROSS REFERENCE TO RELATED APPLICATIONS

This application is a § 371 National Stage Application of PCT/US2015/049803, filed Sep. 11, 2015, which, in turn, claims the benefit of priority under 35 U.S.C. § 119(e) to provisional U.S. Patent Application No. 62/071,000, filed Sep. 11, 2014, the entire contents of each of which are hereby incorporated by reference.

STATEMENT REGARDING FEDERALLY SPONSORED RESEARCH AND DEVELOPMENT

This invention was made with partial government support under the National Science Foundation Grant Number IIS-1344768. The government has certain rights to this invention.

BACKGROUND

The present disclosure relates to determining an association between a person and a mobile device carried by the person.

Mobile devices have become an indispensable companion for our everyday lives. People use them to check email, chat with friends, and play games. Many applications running on mobile devices generate traffic even when the users do not interact with the devices. Some applications periodically send and receive background data to synchronize with the cloud. Even the operating system generates traffic without user initiation (e.g., to proactively find available Wi-Fi access points).

SUMMARY

The present disclosure describes a system that determines an association between a person and a mobile device carried by the person. The system utilizes captured wireless data and computer vision to infer user-device links, i.e., inferring which device belongs to which person. The system identifies user-device links based on users' activities, which can be observed both visually through a camera and wirelessly through a radio frequency (RF) signal receiver. Knowing which device belongs to which user may open up new opportunities for applications such as identifying unauthorized personnel in enterprises or tracking criminals by law enforcement. A person's visual identity (e.g., captured through the camera) and a device's network identity (e.g., captured through the RF receiver) can be combined to infer additional information about a person or a group of interest (e.g., finding people who are socially connected, but come to a certain place at different times of a day).

In one aspect, a system includes one or more processing devices that perform operations comprising: detecting one or more human objects in images captured by a visual image recording device; obtaining a motion timeseries for each of the detected one or more human objects using the captured images; receiving RF signals from one or more mobile devices; obtaining a received signal strength (RSS) timeseries for each of the one or more mobile devices, based on the received RF signals from the one or more mobile devices; and generating an association between (i) identifying data for a first mobile device of the one or more mobile devices, and (ii) identifying data for one of the one or more human objects representing a first human, wherein the first mobile device has an RSS timeseries that fluctuates at a time period corresponding to movement in the obtained motion timeseries for the one of the one or more human objects representing the first human.

Implementations of the disclosure can include one or more of the following features. The visual image recording device may include a camera. A human object may be a visual representation of a portion of a human. The portion of the human may include one or more of a face of the human, shoulders of the human, or upper body of the human. The RF receiver that is configured to receive the RF signals from the one or more mobile devices may include a Wi-Fi receiver that is configured to receive Wi-Fi data packets from the one or more mobile devices, and wherein each of the Wi-Fi data packets comprises a MAC address and an IP address. Detecting the one or more human objects may include detecting a portion of a human in the captured images. Detecting the one or more human objects may include detecting the one or more human objects that appear in multiple captured images using an appearance model. Obtaining the motion timeseries for each of the detected one or more human objects may include tracking a three-dimensional trajectory of the one or more human objects using the captured images. Obtaining the motion timeseries for each of the detected one or more human objects may include determining speed of movement for each of the one or more human objects using the captured images. Obtaining the motion timeseries for each of the detected one or more human objects may include determining that the speed of movement exceeds a threshold speed. Obtaining the RSS timeseries for each of the one or more mobile devices may include determining RSS variance, minimum, maximum, ranges, and coefficient of variation extracted from a two second sliding window. Obtaining the RSS timeseries for each of the one or more mobile devices may include computing spectral density of the received RF signals for each of the one or more mobile devices and averaging the computed spectral density over bands of interest. Generating the association may include computing a similarity score between the motion time series for each of the detected one or more human objects and the RSS timeseries for each of the one or more mobile devices. Generating the association comprises generating the association based on the computed similarity score between the motion timeseries for the human object representing the first human and the RSS timeseries for the first mobile device exceeding a threshold score. The operations may include detecting an inverse proportionality between computed distances of the human object representing the first human from the visual image recording device and received RSS of the first mobile device, and generating the association based on the detected inverse proportionality.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. While specific implementations are described, other implementations exist that include operations and components different than those illustrated and described below. Other features, objects, and advantages will be apparent from the description, the drawings, and the claims.

DETAILED DESCRIPTION

Figure 1:
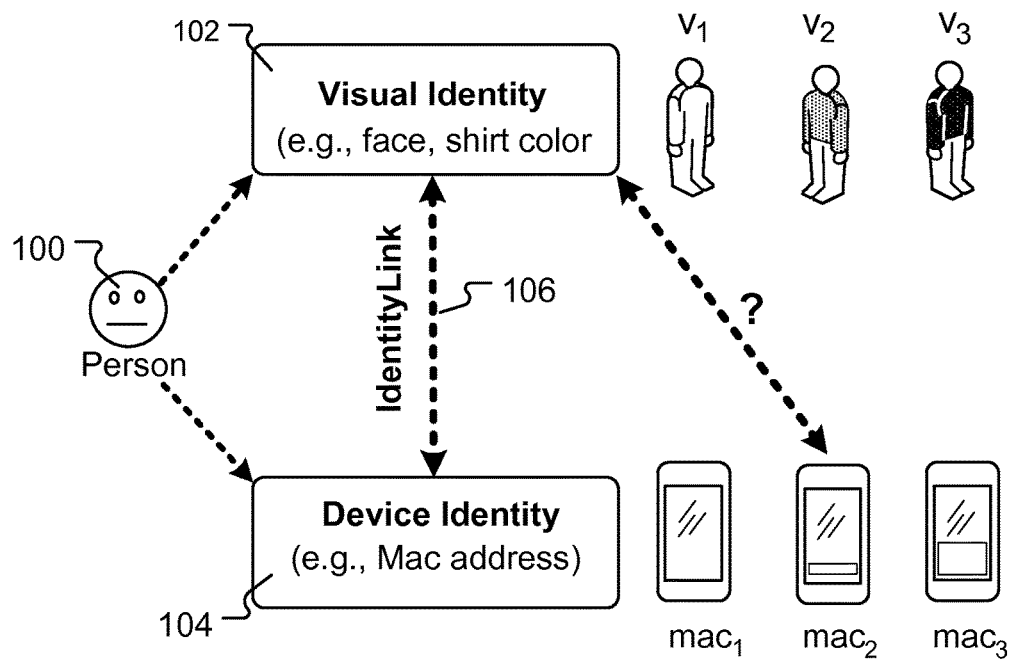
FIG. 1 is a diagram showing an association between a visual identity and a device identity.

As shown in FIG. 1, a person 100 can be identified by a visual identity 102 (e.g., a face in an image captured by a camera) or a device identity 104 (e.g., MAC address captured by a RF receiver). A link 106 can be inferred between the identities belonging to the same person, i.e., inferring which device identity 104 belongs to which visual identity 102. A person may be mapped to a single visual identity, i.e., a face may be uniquely identified as a particular person, while a device identity may map to zero or more people. Thus, this specification may refer to the visual-device identity linking problem as a user-device linking problem. Moreover, this specification may use the term "person" to refer to his or her visual identity.

Figure 2:
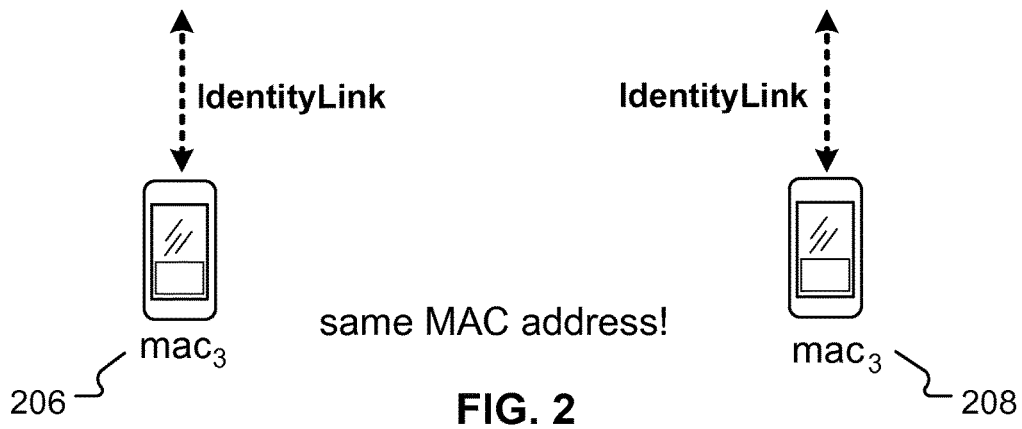
FIG. 2 is a diagram showing user-device linking in re-identification.

There are several applications that may benefit from user-device linking, such as re-identification, context-aware applications, enterprise security, and law enforcement. Referring to FIG. 2, the goal in re-identification is to detect whether visual identities 202 and 204 appearing in different video feeds belong to the same person (e.g., is the person A appearing in a video feed captured on Monday the same as person B appearing in a video feed captured on Friday?). Vision-based features such as a face, body shapes, or clothing may be used to re-identify a person. However, these features may be occluded (e.g., by sunglasses or a cap) or modified (e.g., a person growing a beard), which may make re-identification challenging. Instead of relying only on the visual identifiers 202 and 204 extracted through computer vision, the unique identifiers 206 and 208, such as the device MAC address, of the mobile device carried by the user may be used for re-identification. First, the visual identities 202 and 204 of the human subjects visible in the images captured by a camera are associated, or linked, with device identities 206 and 208, respectively. A match between the device identities 206 and 208 may be an indicator that the two visual identities 202 and 204 belong to the same person.

In context-aware applications, camera-based systems may be used to infer a user's context information such as mood, whether the user is alone or with family, what item the user is looking at in a store, etc. By linking the user's visual identity and device identity, this contextual information can be delivered to the mobile device of the user. Context-aware applications such as product search, promotions discovery, or restaurant recommendations can leverage such contextual information to deliver more accurate results.

In enterprise security applications, enterprise networks are often well-protected from the outside but may be vulnerable to unauthorized access by insiders. While existing techniques can identify which device is used for unauthorized access, the techniques described in this specification can be used to further identify the person operating the device. Moreover, in cases of device theft, the techniques described in this disclosure can be used to identify the visual identity of the person who stole the device.

In law enforcement applications, modern public safety systems may use widely deployed surveillance cameras to detect criminal activities such as vandalism and theft. However, criminals may cover their faces to avoid identification. Mobile devices carried by the criminals may expose a significant amount of information about them such as their affiliation (e.g., school, work place), places they frequently visit (e.g., restaurants, hotels), and their social relationships. The techniques described in this specification can be used to identify the device carried by a criminal and provide law enforcement agents with this additional information.

By using multiple sensors, the advantages of each sensing modality can be combined. Vision-based sensing has many advantages, since it allows passively tracking users' fine-grained location, activities, and interactions in the environment. The techniques described in this specification opportunistically leverages wireless signals sent out from the user's mobile devices to link the users with their devices. These techniques can address the re-identification problem without having users carry any special hardware or requiring them to install an application on their mobile devices. These techniques may reduce the user's effort (e.g., a user can use the context-aware search without installation of any additional application). Additionally, these techniques can be applied to application scenarios where one cannot assume cooperativeness of the mobile device users (e.g., the mentioned law enforcement applications).

In such applications, it may be desirable to enable the linking capability without a user's intervention or recognition. Therefore, the technique infers links by only passively observing people and devices, without putting any additional sensors on people, or installing or modifying any application on their devices. The system may be used by a single passive observer equipped with video recording and Wi-Fi monitoring capabilities. These capabilities are typically available in a single smartphone, allowing easy deployment in an arbitrary environment. This technique can leverage any available surveillance and Wi-Fi infrastructure.

Figure 3:
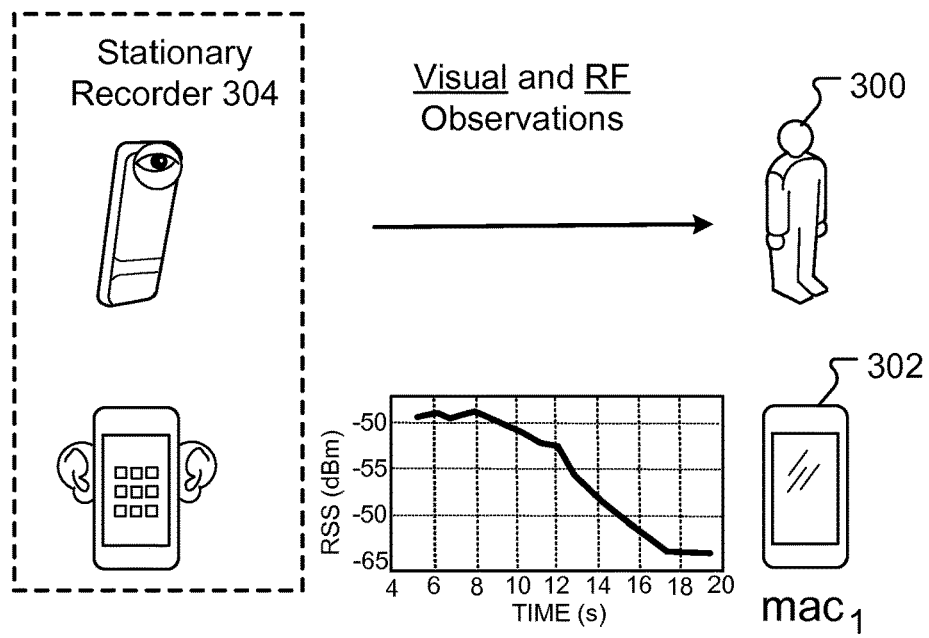
FIG. 3 is a diagram showing an inverse relationship between distance and RSS.

As shown in FIG. 3, when a person 300 carrying a mobile device 302 walks away from a recorder 304, the recorder 304 detects an increased distance using images captured by its camera, and the recorder 304 detects a decreased received signal strength (RSS) of the signals received by the RF receiver. In an environment with multiple users and devices, the recorder 304 analyzes the visual and RF-signal patterns to infer user-device pairs.

Referring again to FIG. 1, the user-device linking problem is based on the visual identities $v_1, \ldots, v_n$ observed by a camera and device identities (e.g., MAC addresses) $mac_1, \ldots, mac_m$ observed by a RF receiver. $P(v_i)$ and $P(mac_j)$ denote the person associated with the visual and device identities. If $P(v_i)=P(mac_j)$, then $v_i$ and $mac_j$ belong to the same person.

The user-device linking problem can be solved using an appropriate score function to compute how likely $v_i$ and $mac_j$ belong to the same person. Referring to the diagram 400 shown in FIG. 4, $S(v_i, mac_j)$ is a score function that indicates a likelihood of a visual identity $v_i$ and a device identity $mac_j$ belonging to the same person. Given a visual identity $v_i$, the system finds a device identity mac* so that $P(v_i)=P(mac^*)$. This corresponds to finding a mac* that has the highest score for a given $v_i$ as follows:

$$mac^* = \underset{mac_j}{\operatorname{argmax}} S(v_i, mac_j)$$

Figure 4:
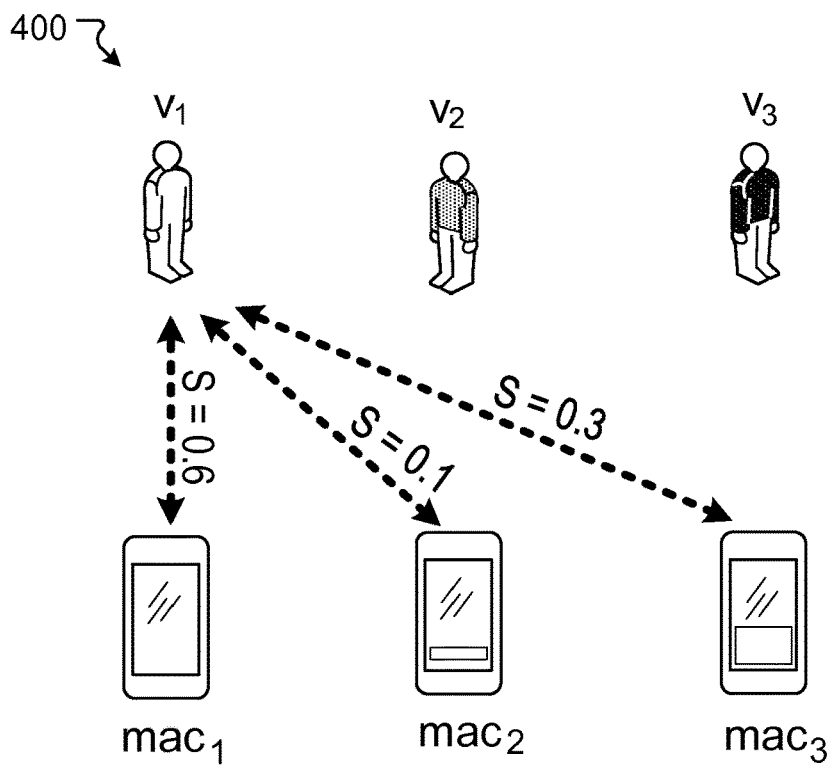
FIG. 4 is a diagram showing computed similarity scores between a visual identity and multiple device identities.

For each $v_i$, the system uses each $mac_j$ to compute a score. The system selects the $mac_j$ with the highest score and assigns it to $v_i$. As shown in FIG. 4, the computed score $S(v_1,mac_1)=0.6$, the computed score $S(v_1,mac_2)=0.1$, and the computed score $S(v_1,mac_3)=0.3$. The system selects $mac_1$ corresponding to the highest score of 0.6 and assigns it to $v_1$.

The above problem statement assumes that each $v_i$ is associated with exactly one $mac_j$. However, there are situations when $v_i$ is not associated with any device identity (e.g., the person does not carry a phone). To address this case, a threshold may be used, e.g., a mac* is assigned to $v_i$ only if $S(v_i,mac^*)$ is greater than a certain threshold. This may eliminate linking of a visual identity and a device identity that are not likely to belong to the same person.

Moreover, there are cases when $v_i$ is associated with more than one device identity (e.g., the person carries more than one phone). To address this case, techniques for detecting co-moving devices may be used. First, the device identity mac* with the highest score for the visual identity $v_i$ is linked to $v_i$, then all devices co-moving with mac* is linked to $v_i$ as well.

Figure 5:
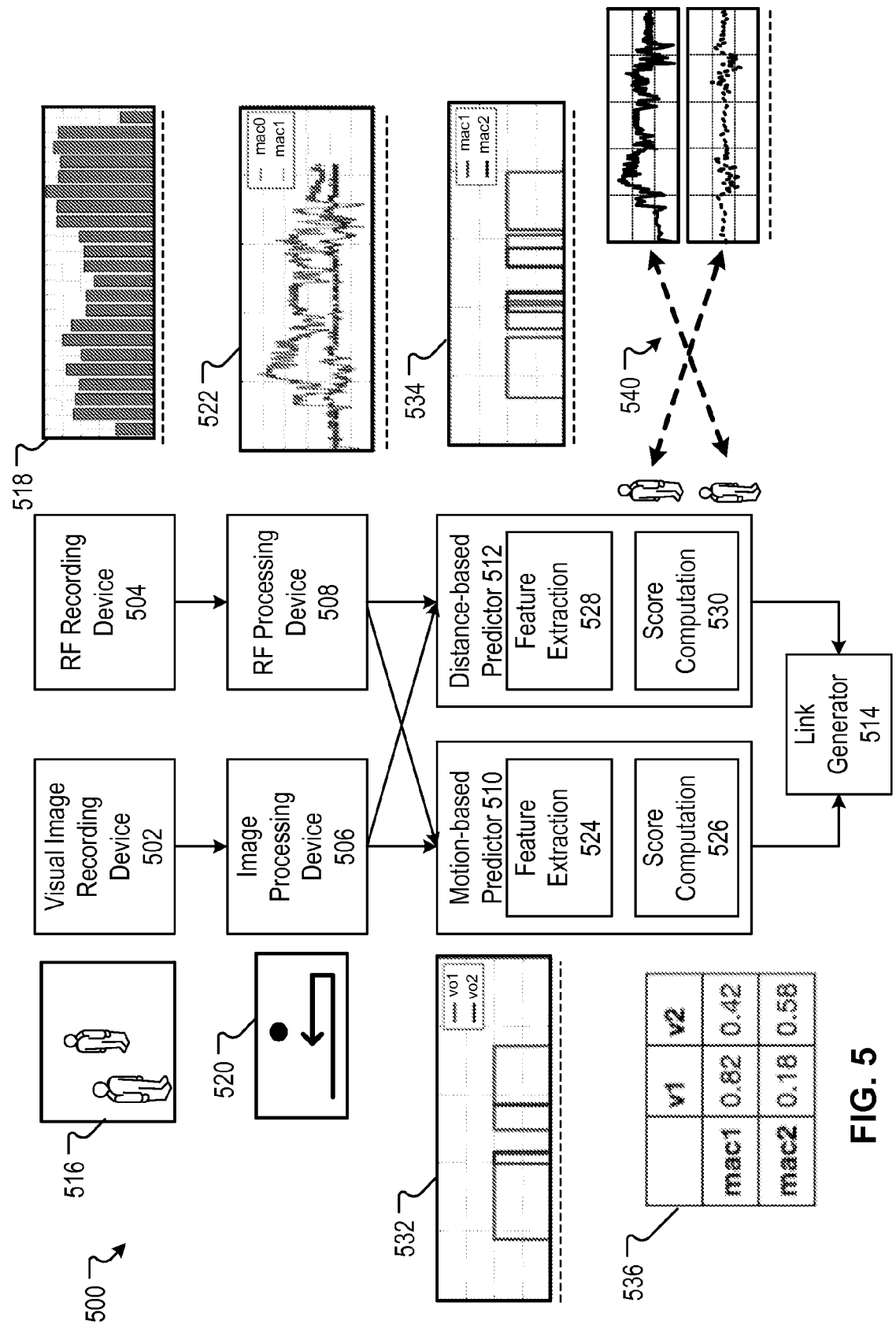
FIG. 5 is a block diagram showing an example of a system for associating visual identities with device identities.

FIG. 5 is a block diagram of an example of a system 500 for associating a visual identity with a device identity. The system 500 includes a visual image recording device 502, a RF recording device 504, an image processing device 506, a RF processing device 508, a motion-based predictor 510, a distance-based predictor 512, and a link generator 514. The visual image recording device 502 may be a video camera, a two-dimensional (2D) surveillance camera, a three-dimensional (3D) camera, a heat-sensing camera, a light detection and ranging device (e.g., LIDAR), or any suitable device that captures data from which the visual identity of a person can be determined. The RF recording device 504 may be a Wi-Fi receiver (e.g., in a Wi-Fi enabled mobile phone or a Wi-Fi access point), a Bluetooth receiver, or any suitable RF device that can capture wireless data packets.

The visual image recording device 502 may record a video 516 of a scene within its view. The RF recording device 502 captures wireless data 518 from mobile devices within its coverage area. The recorded video 516 is processed by the image processing device 506 to determine movement trajectory data 520 for each person in the video. The RF processing device 508 converts the wireless data 508 into RSS timeseries data 522. User trajectory data 520 and RSS timeseries data 522 are input into the motion-based predictor 510 and the distance-based predictor 512, with the video 516 and RF timestamps of the wireless data 508 synchronized.

The motion-based predictor 510 includes two stages: feature extraction 524 and score computation 526. The distance-based predictor 512 includes two stages: feature extraction 528 and score computation 530. In the first stage of each predictor, the feature extraction 524 and 528 converts the input into visual features and RF features. For example, the motion-based predictor 510 extracts visual motion features from trajectory data 520 by inferring when a person moved and when he or she was stationary. Thus, the visual motion features correspond to visual motion timeseries 532 where 0 indicates no movement and 1 indicates non-trivial movement. Similarly, the motion-based predictor 510 infers the RF motion features from the RSS timeseries 522. The RF motion features correspond to RF motion timeseries 534. The motion-based predictor 510 and the distance-based predictor 512 is described in more detail below.

In the second stage of each predictor, the score computation 526 and 530 compute a score for each pair of visual and RF features, yielding a score matrix, e.g., score matrix 536. The score matrices of both predictors 510 and 512 are input into the link generator 514, which determines the user-device links 540.

Figure 6:
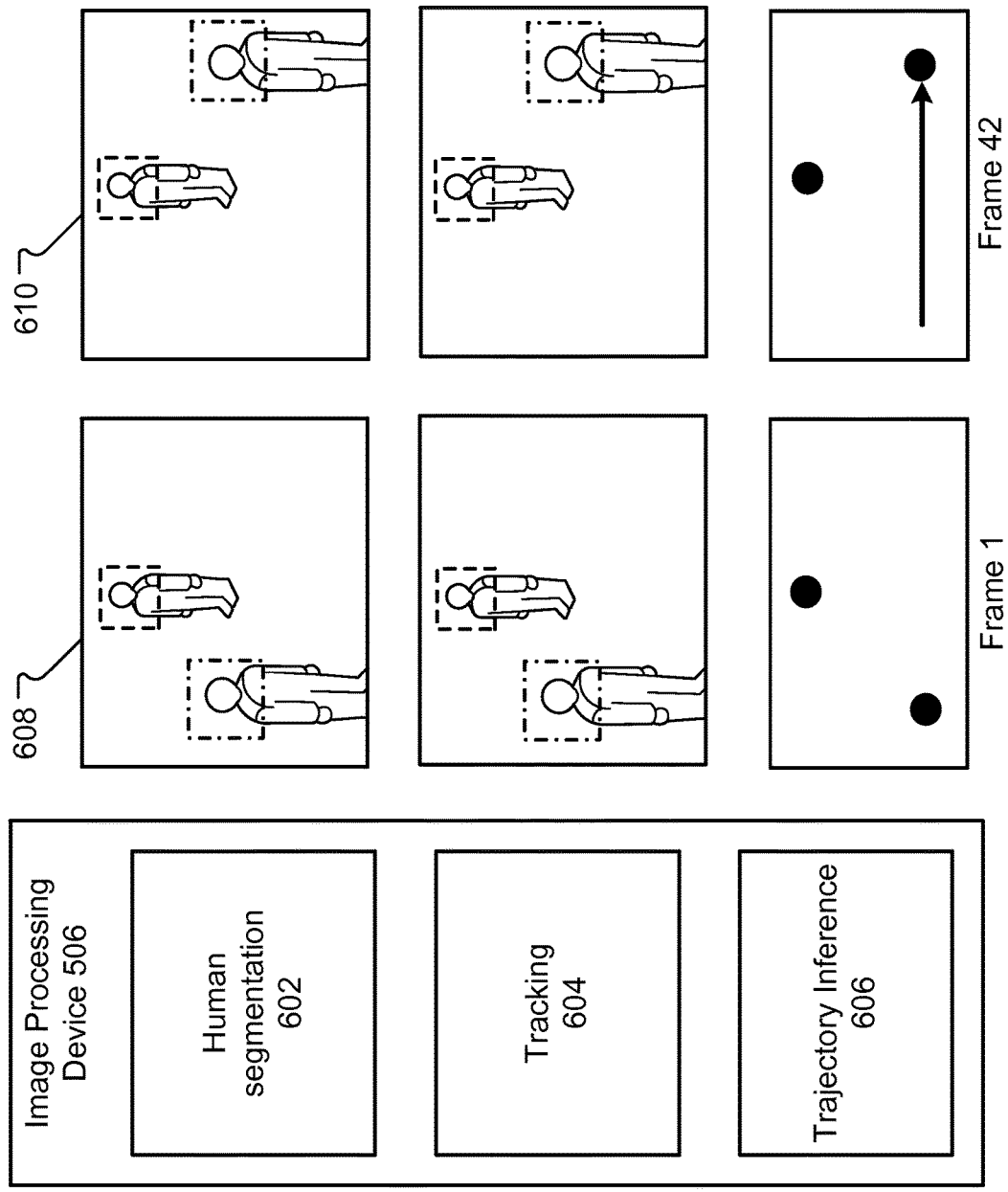
FIG. 6 is a block diagram showing an example of an image processing device for processing image data.

The video 516 may be recorded using a stationary camera. The image processing device 506 infers the location of human objects detected on in the video 516. Video processing is divided into three steps: human segmentation 602, tracking 604, and trajectory inference 606 as shown in FIG. 6.

In the human segmentation step 602, human objects (shown as a rectangle in frames 608 and 610) are identified in each video frame, e.g., Frame 1 to Frame 42. Human objects may be detected based on faces, upper body shapes such as head and shoulders, or any other characteristics of a person. Detecting human objects based on upper body shapes may result in detecting partially hidden people or those not facing the camera. Other suitable methods for human segmentation could be used.

In the tracking step 604, human objects that appear on multiple frames and belong to the same person are detected and tracked. An appearance model, which assigns human objects with the same clothing color to the same visual identity, can be used in the tracking step 604. For example, a person in a pink shirt may be assumed to be the same person, and the human object representing the person in the pink shirt may be assigned to the visual identity $v_1$. Other suitable techniques to identify human identities such as using human face or body shapes may also be utilized.

In the trajectory inference step 606, human subject trajectories are inferred. Any suitable technique may be used to infer a 3D trajectory from image sequences captured from an ordinary camera. For example, an output of a 3D camera may be used to estimate people's trajectories.

Referring again to FIG. 5, the RF recording device 504 may be any device with an RF receiver, such as an access point (AP), laptop, or smartphone, that can capture RF data, e.g., Wi-Fi packets, sent over the air. When RF data such as a Wi-Fi packet is received, the time of arrival, the sender MAC address, and the RSS value for each captured packet is recorded. By grouping data packets from the same sender, one RSS timeseries is obtained for each sender. The RF device 504 may be configured to capture a sufficient amount of RSS samples (e.g., around 10 samples per second) in order to infer user-device links.

Traffic induction techniques may be used to increase the amount of data generated by the tracked device. One traffic induction technique assumes that the tracked devices are connected to a certain Wi-Fi network, and the RF recording device 504 has access to this network (e.g., enterprise Wi-Fi network). The MAC and IP address of surrounding devices may be obtained by simple eavesdropping or by broadcasting messages, e.g., Internet Control Message Protocol (ICMP) Echo Request (ping) messages, and listening for replies, each reply providing useful measurement data. Depending on how much information is available for certain device IP addresses, more or fewer requests can be sent to specific addresses as needed. This technique may result in user devices providing useful measurements at a rate of over 50 samples per second.

Another traffic induction technique extends on the above described technique to include cases where a target device is either not connected to any network or connected to a network the RF recording device 502 may not have access to. In this case, the RF recording device 502 may force the target devices to connect to its own network. Wi-Fi client software on target devices may actively search for previously used APs, using control messages known as probe requests containing the SSIDs of preferred APs. After the RF recording device 504 passively observes probe requests from target devices, the RF recording device 504 can advertise a fake AP copying one of the target's SSIDs. As long as the fake AP transmits with a strong signal, the target devices would automatically connect to the fake AP, even if the SSID is the same as another nearby AP. Once the target device is connected to the RF recording device 504, the RF recording device 504 can capture RF data.

Figure 7:
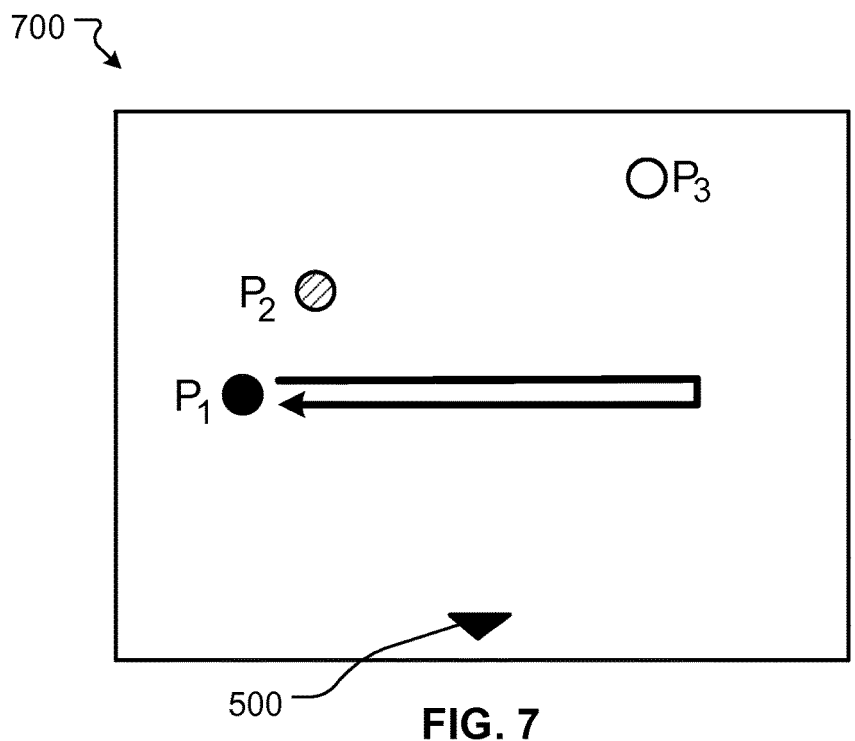
FIG. 7 is a diagram showing a scenario with three people carrying mobile devices.

To illustrate the motion-based predictor 510, FIG. 7 shows a scenario 700 with three people $P_1$, $P_2$, and $P_3$ carrying mobile devices. Two people $P_2$ and $P_3$ are stationary. One person $P_1$ is walking from left to right, pausing for a few seconds, then walking back to the left. The visual identity $v_i$ and the device identity $mac_i$ correspond to person $P_i$. The motion-based predictor 510 shown in FIG. 5 detects users' movements from the video 516 and the RSS timeseries 522. Consider the moving person $P_1$ in the scenario 700 of FIG. 7. At any given time, if the person $P_1$ moves, the movement can be detected by observing the changes in location from the video. At the same time, the RF recording device 504 of the system 500 shown in FIG. 5 will observe a significant RSS fluctuation from the mobile device carried by the moving person $P_1$. This fluctuation is caused by the device changing its location and angle with respect to the RF recording device 504. Since the video reveals when the person $P_1$ started and stopped moving, the system 500 finds a device with RSS fluctuating at the corresponding time period which is referred to as the motion period.

The motion-based predictor 510 includes feature extraction 524 and score computation 526. Feature extraction 524 is further divided into two parts: 1) motion observed in the video and 2) motion inferred from the RSS streams. The feature extraction outputs are visual and RF features, which are then input into the score computation 526 to compute a similarity score for each visual-RF feature pair.

To detect whether a user is moving or not, the system 500 uses trajectories inferred by image processing device 506. The image processing device 500 computes a user's speed $s_t$ at time t as the following:

$$s_t = \|(x_{t-1}, y_{t-1}) - (x_t, y_t)\|_2$$

where $\|\cdot\|_2$ is Euclidean distance, x and y are coordinates of the video object measured in meters and t is time in seconds.

Figure 8:
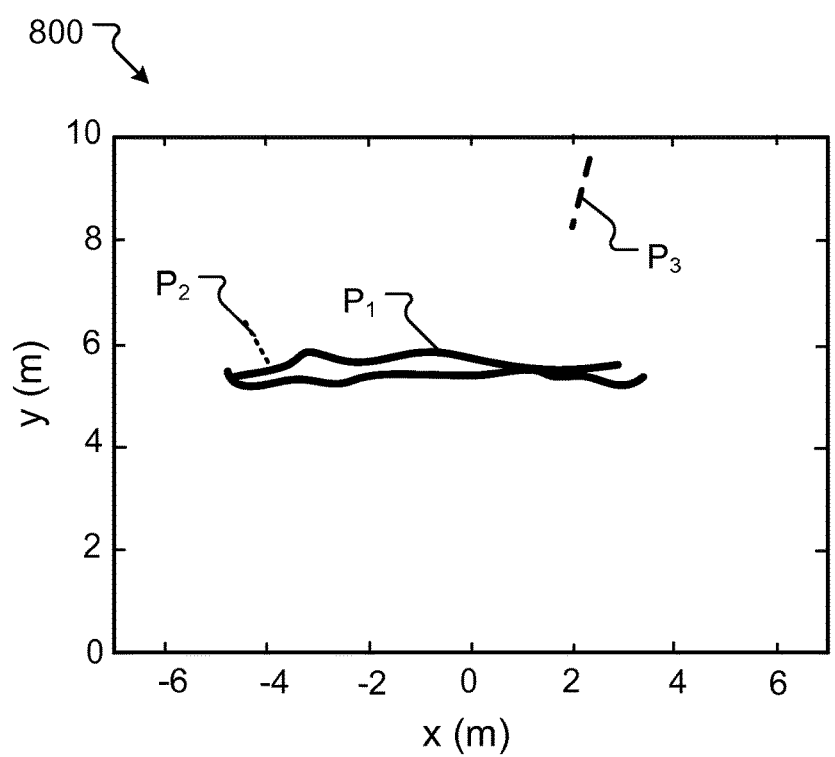
FIG. 8 is a graph showing trajectories for each person in the scenario of FIG. 7.
Figure 9:
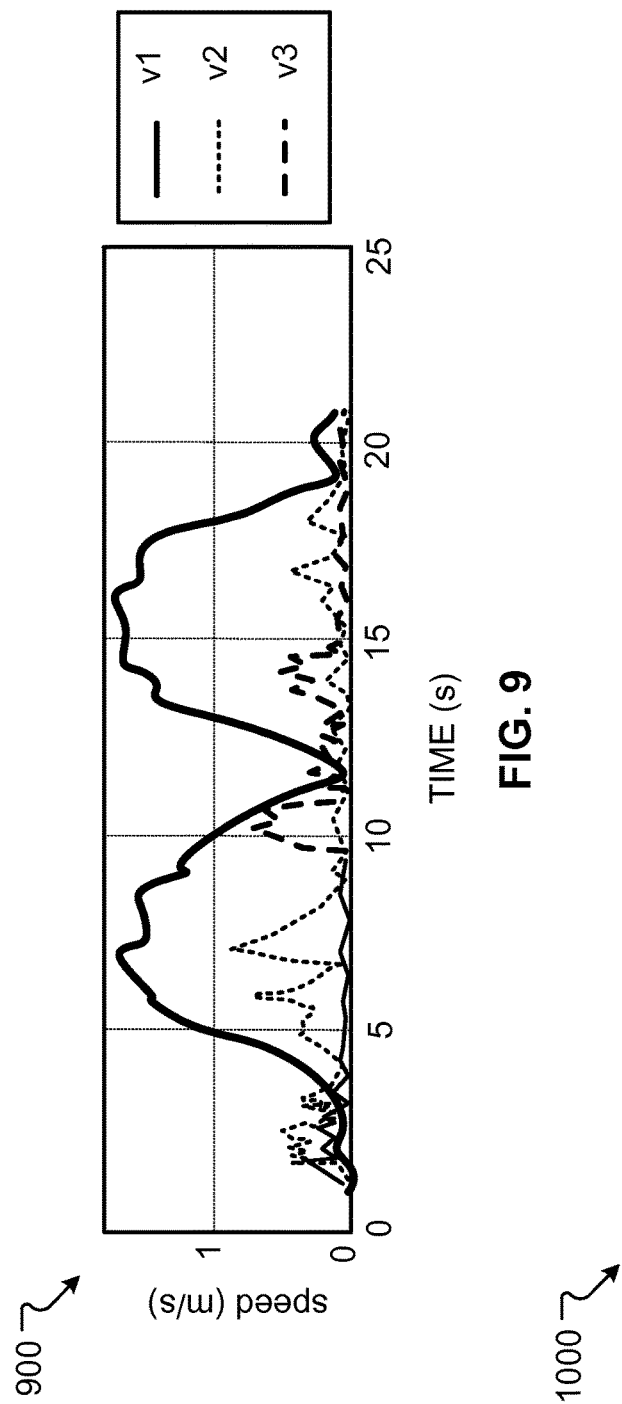
FIG. 9 is a graph showing computed speed for each person in the scenario of FIG. 7.
Figure 10:
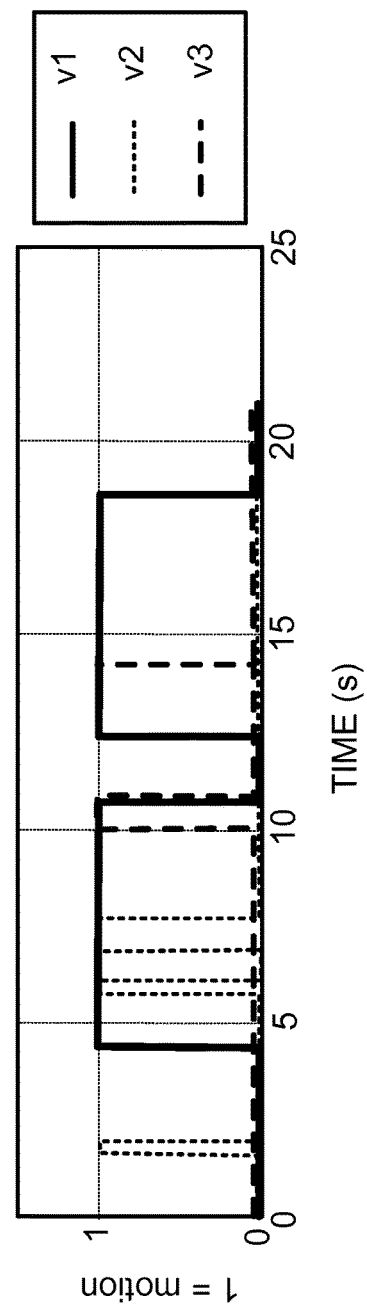
FIG. 10 is a graph showing the detected motion for each person in the scenario of FIG. 7.

FIG. 8 is a graph 800 showing trajectories for each person $P_1$, $P_2$, $P_3$ determined by the image processing device 500. The trajectories are used to compute speed as shown in graph 900 of FIG. 9. A user is moving if the speed crosses a certain threshold. FIG. 10 is a graph 1000 showing the detected motion using a threshold of 0.5. FIGS. 8-10 show that the motion period of visual identity $v_1$ starts at around the fourth second; the person $P_1$ moves for 6 seconds, pauses for a while and then moves for another 6 seconds. FIGS. 8-10 also show false positive of the motion detection for $v_2$ and $v_3$, which are in reality stationary. This may be caused by the noise and inaccuracies of video processing.

Motion detection from the observed RSS stream may be framed as a machine learning model, specifically as a binary classification model, where the motion-based predictor 510 predicts one of the two classes, "moving" or "not-moving". To train the model, statistical features may be used for motion classification, such as RSS variance, minimum, maximum, range (e.g., maximum-minimum), and coefficient of variation extracted from a two second sliding window. Frequency domain features may be extracted by computing the spectral density of the RF signal and then averaging over RF bands of interest.

Figure 11:
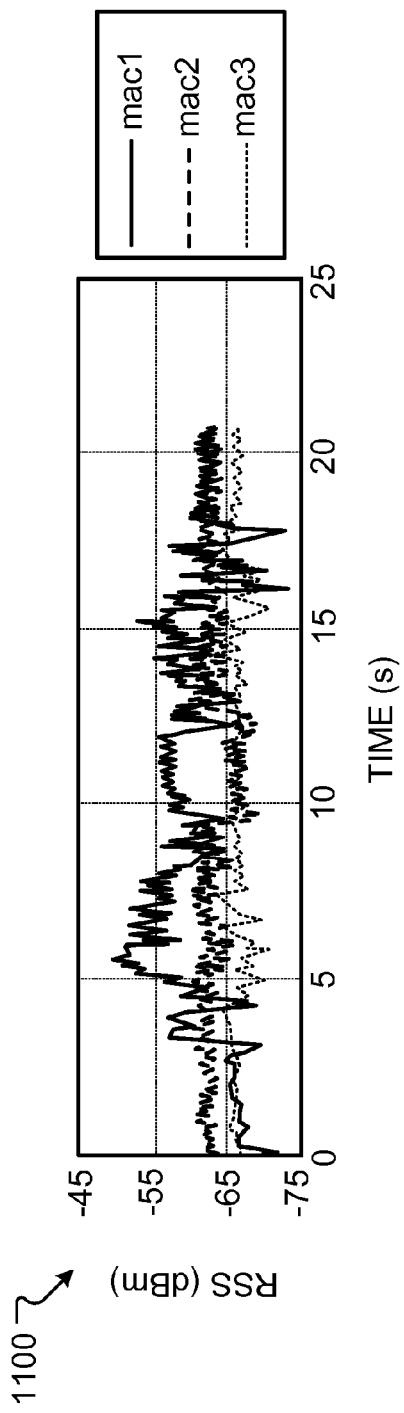
FIG. 11 is a graph showing the RSS timeseries collected for each of the three devices in the scenario of FIG. 7.
Figure 12:
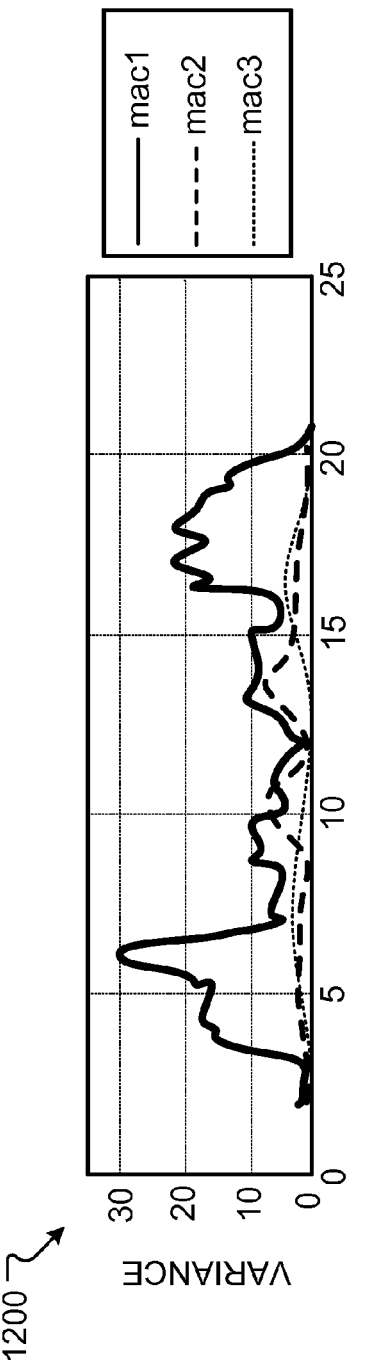
FIG. 12 is a graph showing the RSS variance feature for each of the three devices in the scenario of FIG. 7.
Figure 13:
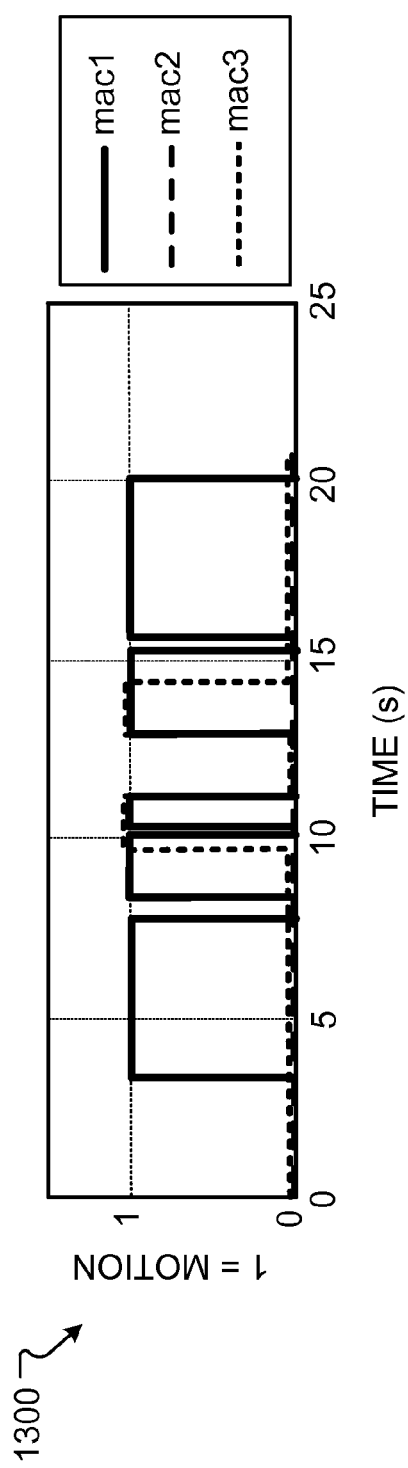
FIG. 13 is a graph showing the prediction output of a motion-based predictor for each of the three devices in the scenario of FIG. 7.

FIG. 11 is a graph 1100 showing the RSS timeseries collected for each of the three devices $mac_1$, $mac_2$, and $mac_3$. FIG. 12 is a graph 1200 showing the RSS variance feature computed using a sliding window with a size of two seconds. Variance of $mac_1$ increases as the person $P_1$ starts moving and decreases when the person $P_1$ pauses. FIG. 13 is a graph 1300 showing the prediction output of the motion-based predictor 510, where 1 indicates that a motion was detected for a certain device at a given time. Similar to the visual case, FIG. 13 shows that the motion period of device $mac_1$ starts at around the fourth second; the device moved for approximately 6 seconds, paused and then moved for another 6 seconds. False positives and false negatives of the prediction shown in FIG. 13 may be caused by the fact that when the person $P_1$ moves, the wireless properties of the environment are changed. This causes RSS fluctuation not only for the moving person's device, but also for devices nearby. In the scenario 700 shown in FIG. 7, $P_1$ crosses the line-of-sight (LOS) between $P_3$ and the system 500 twice. Whenever $P_1$ crosses the LOS, we observe an increase of RSS variance for the device $mac_3$ (as shown in graph 1100 of FIG. 11). This increase may be falsely interpreted as motion, even though the device $mac_3$ is stationary at all times.

To infer links, the score computation 526 computes a similarity score for each pair of visual and RF motion features using the following score function:

$$S_M(v_i, mac_j) = \frac{1}{T} \sum_{t=0}^{T} F_{M,v}(v_i)_t \cdot F_{M,m}(mac_j)_t,$$

where $F_{M,v}(v_i)$ and $F_{M,m}(mac_j)$ are visual and RF-based motion features. The score reflects the time-averaged inner product of the timeseries, capturing the correlation between motion features. Table 1 shows the score matrix for the scenario 700 of FIG. 7. For each visual identity $v_i$, the score computation 526 computes a score for each device identity $mac_j$. The score matrix shows that the pair $(mac_1, v_1)$ has a high score since their motion feature timeseries have a high amount of overlap.

TABLE 1

|  | $v_1$ | $v_2$ | $v_3$ |
| --- | --- | --- | --- |
| $mac_1$ | 0.51 | 0.06 | 0.04 |
| $mac_2$ | 0.00 | 0.00 | 0.00 |
| $mac_3$ | 0.12 | 0.00 | 0.05 |

Figure 14:
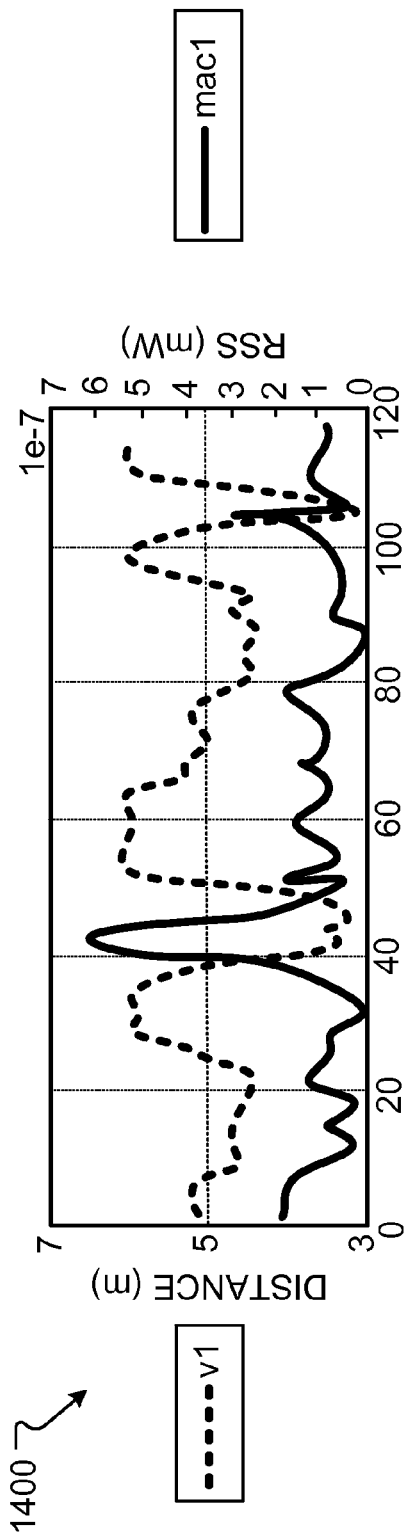
FIG. 14 is a graph showing the inverse proportionality of the distance measure compared to the observed RSS.

The distance-based predictor 512 is based on the inverse relationship between distance and RSS illustrated in FIG. 3. Motion toward and away from the system 500 may result in respective increase or decrease of observed RSS on average. In the case where a person walks in random directions, FIG. 14 is a graph 1400 showing the inverse proportionality of the distance measure compared to the observed RSS. FIG. 14 shows measurements consistent with the expected inverse relationship between distance and RSS. This inverse proportionality may be used to define a window-based score function corresponding to the following covariance function:

$$S'(v_i, mac_j)_k = \frac{1}{T} \sum_{t=k}^{k+w} ((F_{D,v}(v_i)_t - \overline{F_{D,v}(v_i)}) \cdot (F_{D,m}(mac_j)_t - \overline{F_{D,m}(mac_j)}))$$

where $F_{D,v}(v_i)$ and $F_{D,m}(mac_j)$ are the distance and square root of RSS values over time and $\overline{F_{D,v}(v_i)}$ and $\overline{F_{D,m}(mac_j)}$ are their mean values. The size w of a sliding window may be set to two seconds. The final score is computed by summing all the negative covariance values over the sliding windows and then negating the sum to obtain a positive score as follows:

$$S_D(v_i, mac_j) = -\sum_k \min(S'(v_i, mac_j)_k, 0).$$

Note that instead of summing over all the values, the score computation 526 sums up only the negative covariance values (and ignore the positive values). The negative covariance values may be good indicators that the RSS stream and the distance stream belong to the same person moving towards/away from system 500, while the positive values may be caused by the fluctuations of the RSS.

The link generator 514 uses the output score matrices of the motion-based predictor 510 and distance-based predictor 512 to infer user-device links. Each column of the matrix corresponds to a score vector of one visual identity $v_i$, and the entries in this vector are similarity scores with each device identity $mac_j$. The link generator 514 makes a joint prediction using both matrices. Given the motion-based score matrix $S_M$ and the distance-based score matrix $S_D$, the link generator 514 determines a combined score matrix S through normalization and linear combination. Each column $S_M{}^i$ and $S_D{}^i$ of the matrices $S_M$ and $S_D$ corresponding to visual identity $v_i$, is normalized to have unit sum, and the normalized columns may be combined using the following equation:

$$S^i = \alpha S_M{}^i + (1-\alpha) S_D{}^i$$

where $0 \leq \alpha \leq 1$ is a weighting factor between the predictors 510 and 512. Table 2 provides an example of predictor combination for a visual identity $v_i$.

TABLE 2

|  | $S_M{}^1$ | $S_D{}^1$ | $S^1$ |
| --- | --- | --- | --- |
| $mac_1$ | 0.37 | 0.51 | 0.44 |
| $mac_2$ | 0.39 | 0.21 | 0.30 |
| $mac_3$ | 0.24 | 0.28 | 0.26 |

The device identity mac* with the highest score may be linked with the visual identity $v_i$ as follows:

$$mac^* = \underset{mac_j}{\arg\max}\ S^{i, mac_j},$$

where $S^{i, mac_j}$ is the value at column $v_i$ and row $mac_j$ of the combined score matrix S. Table 2 shows that the predictors 510 and 512 individually come to different conclusions. Motion-based predictor 510 may link $v_1$ with $mac_2$, whereas the distance-based predictor 512 may link $v_1$ to $mac_1$. The confidence of the individual predictors can be considered by combining the scores.

The performance of the motion-based predictor 510 depends on many factors such as the number of users, motion patterns, and the amount of RF signals observed. The motion-based predictor 510 performs linking based on the motion periods observed visually and through RF sensing. When motion periods of visual and device identities match (both identities moved between time $t_1$ and $t_2$), the two identities likely belong to the same person. However, with multiple moving subjects, the linking process may be challenging since motion periods of multiple subjects and devices can be time-overlapping. When two subjects are moving at exactly the same time, the motion-based predictor 510 may have insufficient information to differentiate the two devices. In such cases, a moving subject may be linked with a moving device, but since there are two moving devices with similar patterns, the motion-based predictor 510 may randomly choose one of the two moving devices, and eliminate the stationary devices as candidates.

When the motion-based predictor 510 is unable to differentiate two moving devices, the distance-based predictor 512 may be able to differentiate. The distance-based predictor 512 performs well in scenarios where users' distance profiles are distinct. However, if both users have similar RSS patterns, the distance-based predictor may not have sufficient information to differentiate between them. In this case, neither the motion-base predictor 510 nor the distance-based predictor can distinguish between the two users, resulting in a random matching of $v_1$ to one of the two devices.

Figure 15:
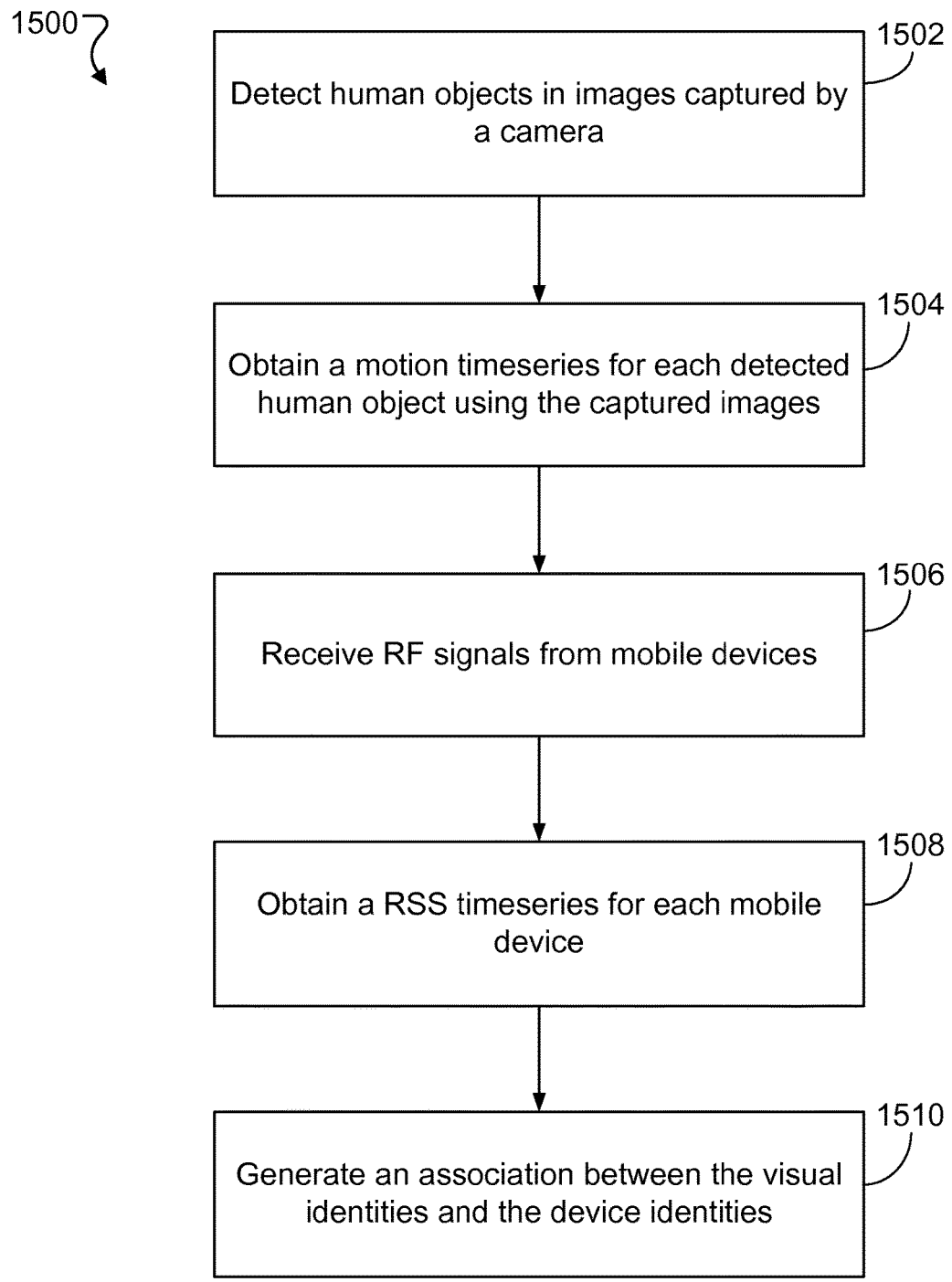
FIG. 15 is a flowchart of an example of a process for generating an association between visual identities and device identities.

FIG. 15 is a flowchart of an example of a process 1500 for generating an association between visual identities and device identities. The process 1500 may be performed by a system of one or more computers, such as the system 500 of FIG. 5. The process 1500 may include details that have been discussed above.

The system detects one or more human objects in images captured by a visual image recording device (1502). The system obtains a motion timeseries for each detected human object using the captured images (1504). The system receives RF signals from one or more mobile devices (1506). The system obtains a RSS timeseries for each mobile device based on the received RF signals (1508). The system generates an association between a visual identity for one of the human objects and a device identity for one of the mobile devices (1510).

Systems can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The implementations described herein, and other implementations, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A system comprising:
    a visual image recording device configured to capture images;
    a radio frequency (RF) receiver configured to receive RF signals from one or more mobile devices;
    one or more processing devices; and
    one or more computer-readable media storing instructions that are executable by the one or more processing devices to perform operations comprising:
        detecting one or more human objects in the captured images;
        obtaining a motion timeseries for each of the detected one or more human objects using the captured images;
        processing the motion timeseries for each of the detected one or more human objects into a visual motion timeseries;
        obtaining a received signal strength (RSS) timeseries for each of the one or more mobile devices, based on the received RF signals from the one or more mobile devices;
        processing the RSS timeseries, using a machine learning model, for each of the one or more mobile devices into a RF motion timeseries, wherein the machine learning model determines at least an RSS variance and a coefficient of variation extracted from a sliding time window of measurement;
        determining an association between a first feature in the visual motion timeseries and a second feature in the RF motion timeseries; and
        generating, in response to determining the association, an association between (i) a first identifier representing a particular mobile device of the one or more mobile devices corresponding to the second feature in the RF motion timeseries, and (ii) a second identifier representing a particular human object of the one or more human objects corresponding to the first feature in the visual motion timeseries, wherein the particular mobile device has an RSS timeseries that fluctuates at a time period corresponding to movement in the obtained motion timeseries for the particular human object of the one or more human objects.

2. The system of claim 1, wherein the visual image recording device comprises a camera.

3. The system of claim 1, wherein a human object is a visual representation of a portion of a human.

4. The system of claim 3, wherein the portion of the human comprises one or more of a face of the human, shoulders of the human, or upper body of the human.

5. The system of claim 1, wherein the RF receiver that is configured to receive the RF signals from the one or more mobile devices comprises a Wi-Fi receiver that is configured to receive Wi-Fi data packets from the one or more mobile devices, and wherein each of the Wi-Fi data packets comprises a MAC address and an IP address.

6. The system of claim 1, wherein detecting the one or more human objects comprises detecting a portion of a human in the captured images.

7. The system of claim 1, wherein detecting the one or more human objects comprises detecting the one or more human objects that appear in multiple captured images using an appearance model.

8. The system of claim 1, wherein obtaining the motion timeseries for each of the detected one or more human objects comprises tracking a three-dimensional trajectory of the one or more human objects using the captured images.

9. The system of claim 1, wherein obtaining the motion timeseries for each of the detected one or more human objects comprises determining speed of movement for each of the one or more human objects using the captured images.

10. The system of claim 9, wherein obtaining the motion timeseries for each of the detected one or more human objects comprises determining that the speed of movement exceeds a threshold speed.

11. The system of claim 1, wherein obtaining the RSS timeseries for each of the one or more mobile devices comprises determining the RSS variance, minimum, maximum, ranges, and the coefficient of variation extracted from a two second sliding time window.

12. The system of claim 1, wherein obtaining the RSS timeseries for each of the one or more mobile devices comprises computing spectral density of the received RF signals for each of the one or more mobile devices and averaging the computed spectral density over bands of interest.

13. The system of claim 1, wherein generating the association comprises computing a similarity score between the motion time series for each of the detected one or more human objects and the RSS timeseries for each of the one or more mobile devices.

14. The system of claim 13, wherein generating the association comprises generating the association based on the computed similarity score between the motion timeseries for the particular human object and the RSS timeseries for the particular mobile device exceeding a threshold score.

15. The system of claim 1, wherein the operations further comprise:
    detecting an inverse proportionality between computed distances of the particular human object from the visual image recording device and received RSS of the particular mobile device, and
    generating the association based on the detected inverse proportionality.

16. A system comprising:
    one or more processing devices; and
    one or more computer-readable media storing instructions that are executable by the one or more processing devices to perform operations comprising:
        detecting one or more human objects in images captured by a visual image recording device;
        obtaining a motion timeseries for each of the detected one or more human objects using the captured images;
        processing the motion timeseries for each of the detected one or more human objects into a visual motion timeseries;
        receiving RF signals from one or more mobile devices;
        obtaining a received signal strength (RSS) timeseries for each of the one or more mobile devices, based on the received RF signals from the one or more mobile devices;
        processing the RSS timeseries, using a machine learning model, for each of the one or more mobile devices into a RF motion timeseries, wherein the machine learning model determines at least an RSS variance and a coefficient of variation extracted from a sliding time window of measurement;
        determining an association between a first feature in the visual motion timeseries and a second feature in the RF motion timeseries; and
        generating, in response to determining the association, an association between (i) a first identifier representing a particular mobile device of the one or more mobile devices corresponding to the second feature in the RF motion timeseries, and (ii) a second identifier representing a particular human object of the one or more human objects corresponding to the first feature in the visual motion timeseries, wherein the particular mobile device has an RSS timeseries that fluctuates at a time period corresponding to movement in the obtained motion timeseries for the particular human object of the one or more human objects.

17. A method comprising:
    detecting, by one or more processors, one or more human objects in images captured by a visual image recording device;
    obtaining, by one or more processors, a motion timeseries for each of the detected one or more human objects using the captured images;
    processing the motion timeseries for each of the detected one or more human objects into a visual motion timeseries;
    receiving RF signals from one or more mobile devices;
    obtaining, by one or more processors, a received signal strength (RSS) timeseries for each of the one or more mobile devices, based on the received RF signals from the one or more mobile devices;
    processing the RSS timeseries, using a machine learning model, for each of the one or more mobile devices into a RF motion timeseries, wherein the machine learning model determines at least an RSS variance and a coefficient of variation extracted from a sliding time window of measurement;
    determining an association between a first feature in the visual motion timeseries and a second feature in the RF motion timeseries; and
    generating, by one or more processors, in response to determining the association, an association between (i) a first identifier representing a particular mobile device of the one or more mobile devices corresponding to the second feature in the RF motion timeseries, and (ii) a second identifier representing a particular human object of the one or more human objects corresponding to the first feature in the visual motion timeseries, wherein the particular mobile device has an RSS timeseries that fluctuates at a time period corresponding to movement in the obtained motion timeseries for the particular human object of the one or more human objects.

18. The method of claim 17, wherein detecting the one or more human objects comprises detecting a portion of a human in the captured images.

19. The method of claim 17, wherein detecting the one or more human objects comprises detecting the one or more human objects that appear in multiple captured images using an appearance model.

20. The method of claim 17, wherein obtaining the motion timeseries for each of the detected one or more human objects comprises tracking a three-dimensional trajectory of the one or more human objects using the captured images.

21. The method of claim 17, wherein obtaining the motion timeseries for each of the detected one or more human objects comprises determining speed of movement for each of the one or more human objects using the captured images.

22. The method of claim 21, wherein obtaining the motion timeseries for each of the detected one or more human objects comprises determining that the speed of movement exceeds a threshold speed.

23. The method of claim 17, wherein obtaining the RSS timeseries for each of the one or more mobile devices comprises determining the RSS variance, minimum, maximum, ranges, and the coefficient of variation extracted from a two second sliding time window.

24. The method of claim 17, wherein obtaining the RSS timeseries for each of the one or more mobile devices comprises computing spectral density of the received RF signals for each of the one or more mobile devices and averaging the computed spectral density over bands of interest.

25. The method of claim 17, wherein generating the association comprises computing a similarity score between the motion time series for each of the detected one or more human objects and the RSS timeseries for each of the one or more mobile devices.

26. The method of claim 25, wherein generating the association comprises generating the association based on the computed similarity score between the motion timeseries for the particular human object and the RSS timeseries for the particular mobile device exceeding a threshold score.

27. The method of claim 17, further comprising:
   detecting an inverse proportionality between computed distances of the particular human object from the visual image recording device and received RSS of the particular mobile device; and
   generating the association based on the detected inverse proportionality.

* * * * *